Dec. 23, 1952     H. G. SOAR     2,622,566
LIQUID METER

Filed May 31, 1949     3 Sheets-Sheet 1

Inventor
Harry G. Soar
by Dowell & Dowell
Attorneys

Dec. 23, 1952     H. G. SOAR     2,622,566
LIQUID METER
Filed May 31, 1949     3 Sheets-Sheet 2
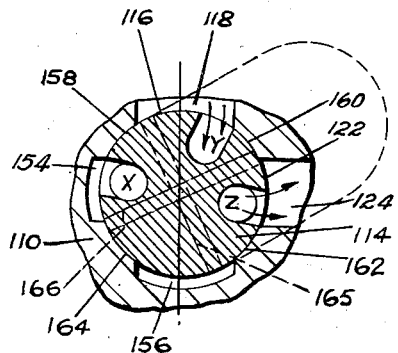
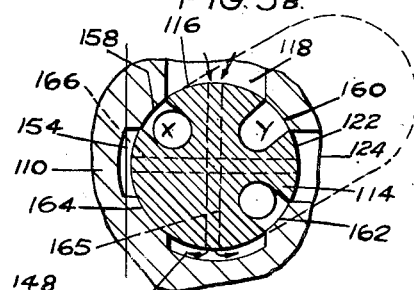
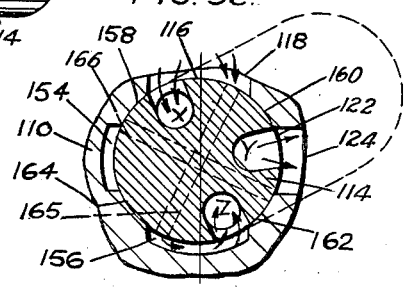
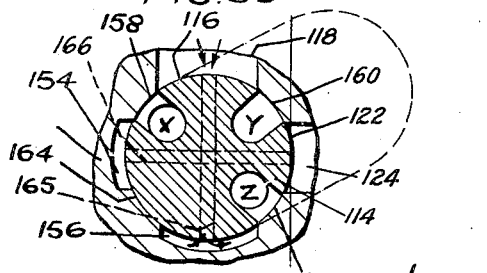
Inventor
Harry G. Soar
by
Dowell N Dowell
Attorneys

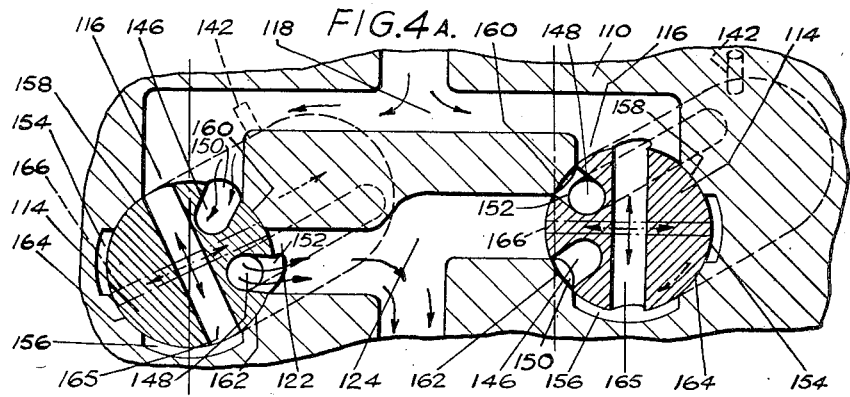
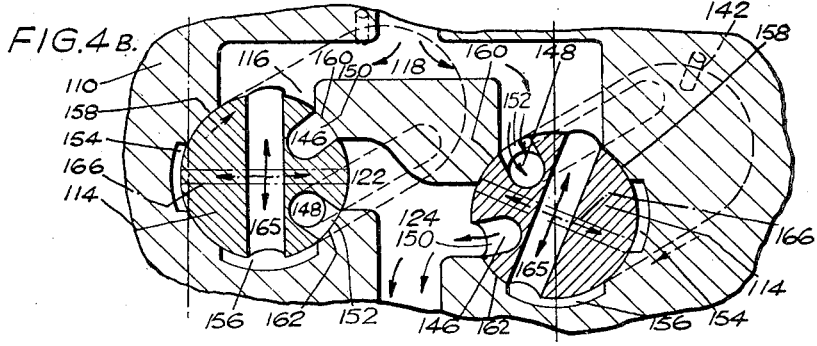
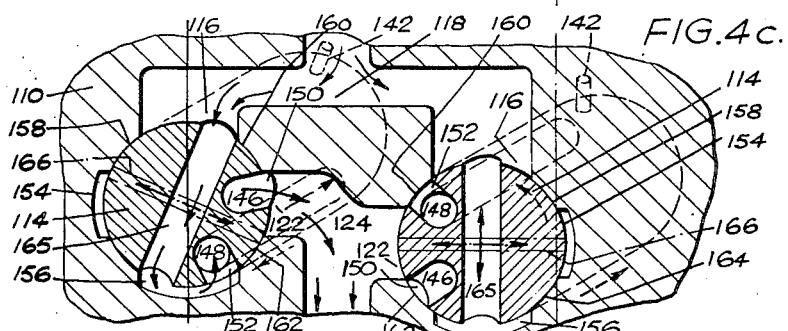
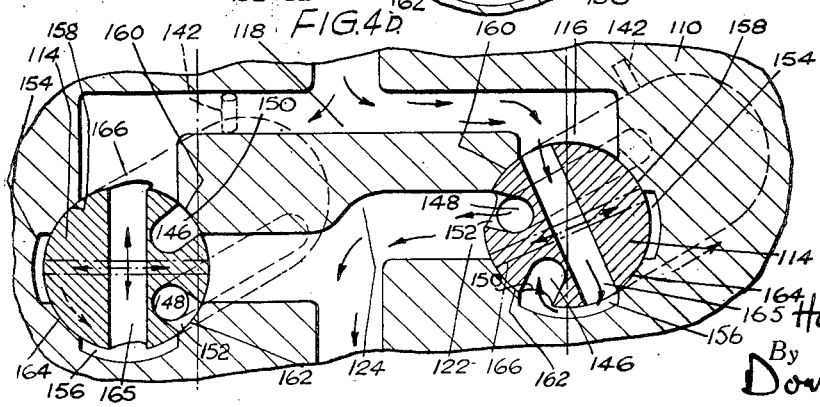

Patented Dec. 23, 1952

2,622,566

UNITED STATES PATENT OFFICE 2,622,566

LIQUID METER

Harry Godfrey Soar, London, England

Application May 31, 1949, Serial No. 96,369
In Great Britain June 4, 1948

5 Claims. (Cl. 121—101)

This invention relates to liquid meters of the type having pistons which reciprocate under the action of the supply or feed pressure and are rotated as a consequence of such axial movement, the rotation serving to make cyclic changes in the circuits from the source of supply to the delivery point.

In such meters, each piston reciprocates in a cylinder closed at each end and has passages, chambers or bores (hereinafter referred to generally as "bores") in it leading from opposite ends of the pistons and terminate at ports in the peripheral surface of the piston. The bores do not extend from end to end of the piston so that if liquid under pressure is delivered into one of the ports, pressure will be exerted on one end of the piston and the piston will move axially in its cylinder. The liquid displaced as a result of that movement is forced through any bore which terminates at the opposite end of the piston and is delivered through the port of that bore. By rotating, or oscillating, the piston during its reciprocation, the ports can be brought alternately into communication with feed and delivery passages so that the liquid can pass from the source of supply to the delivery point whether the piston be moving in one direction or the other. It is usual to couple two such pistons together, the two pistons being out of phase with each other and thus ensuring continuous delivery.

Theoretically, such meters are very attractive, but little practical use has been made of them. This is largely because they are expensive to manufacture, the high cost arising out of the high degree of accuracy with which the ports must be made to register with obturating surfaces at different times during the operation of the meter. Lack of accuracy in this respect can cause the meter to be wholly inoperative and, at the best, leads to leakage and loss of metering accuracy. As the meters are expensive to make, it is essential that they should have a long life and meters which have been proposed to be used in the past have also suffered in this respect because no provision was made for balancing the radial forces acting on the pistons. The only solution of the problem of producing such balance which appears to have been proposed so far is the duplication of the ports and bores and their arrangement in diametrically opposite pairs. This solution leads to such complications in the design of the cylinders that it has no practical value. Moreover, increase in the number of ports the opening and closing of which has to be very accurate both as to their extent and as to their timing is a bad feature because each such port is a potential source of leakage and, therefore, of loss of metering accuracy. The minimum number of ports necessary in any of the previously proposed meters is four.

The invention is concerned with the problems of balancing the radial thrust on the pistons of such meters, of increasing the accuracy of such meters and of reducing the manufacturing cost.

These desirable objects can all be achieved as a result of the simple expedient of providing in each piston a passage which passes through it transversely to its axis and which, in all positions of the piston, maintains communication with the source of supply.

The major radial thrust acting on the piston is that exerted directly by the source of supply. In order to balance that thrust, it suffices to form the cylinder of each piston in such a way that the liquid which passes through the said passage acts on an area of the piston equal and opposite to that acted upon directly by the source of supply.

There is also a minor radial thrust due to the fact that a certain area of the piston is subjected to the pressure which exists on the delivery side. This can be balanced similarly by a second passage running transversely to and out of communication with the first leading to a space bounded by an area equal and opposite to that acted upon directly by the delivery pressure.

The simplest and most efficient manner of defining the areas on which the supply and delivery pressures are to be caused to act is to fit each cylinder with a liner having appropriate slots cut in it, the material between the slots forming "lands" serving as obturating surfaces for the ports at the transition stages, that is to say when a port is cut off from communication with the supply and put into communication with the delivery side and vice-versa.

The pistons being balanced, the number of ports and bores can be reduced from the previous minimum of four to three and even to two.

Where three ports are provided, only two are in effective use at any time. Thus, one port is alternately an idle port and a supply port; another port is alternately a supply port and a delivery port; and the third is alternately a delivery port and an idle port.

Where only two ports are provided, one acts as a supply port while the other acts as a delivery port and vice-versa. The supply of liquid to one of the two ports is effected directly; that to the other port is effected indirectly through a transfer passage extending transversely through the piston and which may be, and preferably is, the above-mentioned major balancing passage.

In order that the invention may be thoroughly understood and be more readily carried into effect two examples of meters in accordance with the invention will now be described with reference to the accompanying drawings in which:

Fig. 3 is a perspective view of one of the pistons of the meter.

Figs. 4A–4D are diagrams showing the various phases in the operation of the meter and Figs. 5A–5D are diagrams showing the various phases of a modified form of the meter.

Figure 1:
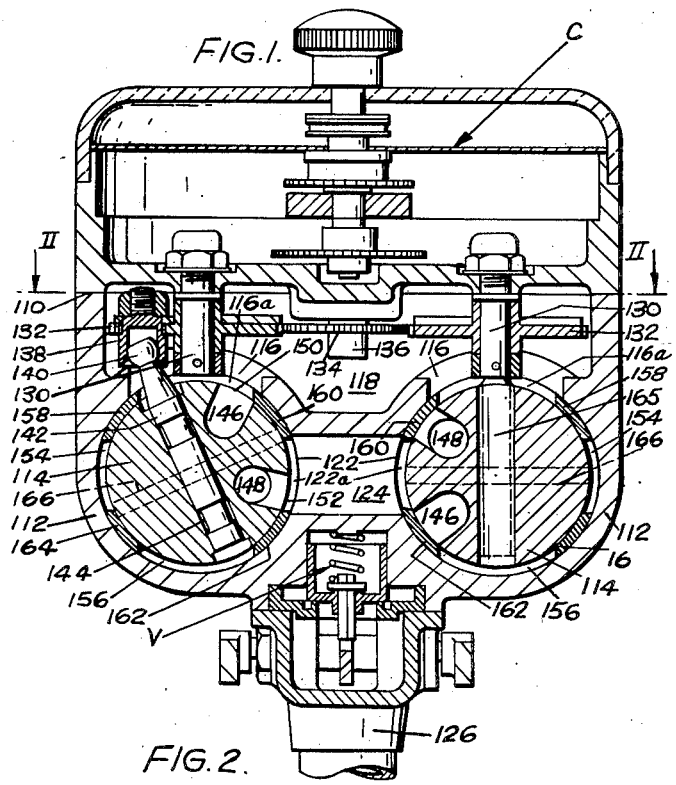
Fig. 1 is a cross section through the preferred form of the meter in accordance with the invention.
Figure 2:
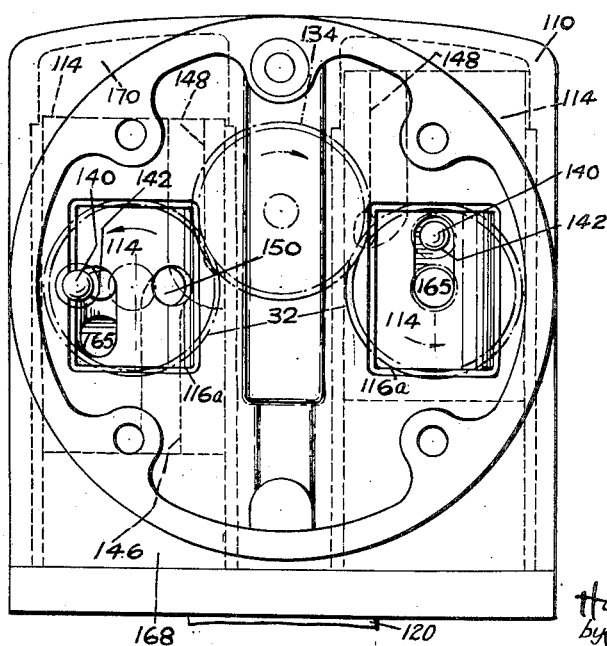
Fig. 2 is a section taken on the line II—II in Fig. 1.

The meter shown in Figs. 1 and 2 was designed for the dispensing of lubricating oil to motorists. It therefore embodies an indicating mechanism or "clock" C in its casing 110 which is of no particular interest in this application but which is described in U. S. application No. 101,738.

In the casing 110 are formed two cylinders 112 having closed ends and each housing a piston 114. The cylinders have openings 116 which lead to a passage 118 connected through a pipe 120 to a source of supply of liquid (assumed here to be oil); they also have openings 122 which lead to a passage 124 connected by a pipe 126 to a delivery nozzle not shown. A valve V arranged in the delivery passage 124 is of no particular interest in this application but is described in application Serial No. 101,738.

The cylinders are fitted with liners 128 which are slotted at 116a and 122a opposite the openings 116 and 122.

The casing supports a pair of spindles 130 on which are loosely mounted pinions 132. These mesh with a common pinion 134 fixed to the spindle 136 of the clock C. Each pinion 132 carries a bearing 138 for the ball-end 140 of a crank pin 142 which is housed in a hole 144 in the associated piston. Reciprocation of either of the two pistons thus causes the associated pinion 132 to rotate and drive the pinion 134 and, therefore, the clock C; it also causes the pinion 132 associated with the other piston to rotate and to reciprocate that piston; further it causes the two pistons to oscillate about their axes.

In Figs. 1 and 2, the left hand piston is shown in its mid-stroke and extreme counter-clockwise position; the right hand piston is shown at one end of its stroke and in its central rotational position. Thus, the pistons are half a stroke and 90° out of phase.

Each piston is formed with two bores 146 and 148 running from opposite ends parallel to the axis and terminating in ports 150 and 152 in the peripheral surface of the piston.

The liners 128 also have slots 154 and 156 cut in them so that each has four slots separated by four "lands" 158, 160, 162, 164. The four slots 116a, 122a, 154 and 156 are all longer than the stroke of the pistons so that the ports 150 and 152 always lie within the length of the slots. The rotation or oscillation of the pistons, however, causes the ports to be covered and uncovered at various times by one or another of the lands as will be explained further on.

Finally, each piston is formed with two transverse passages 165 and 166. The passage 165, in all positions of the piston, establishes communication between the slots 116a, and 156; the passage 166, in all positions of the piston establishes communication between the slots 122a and 154.

The operation of the meter will be understood from a consideration of Figs. 4A to 4D. The broken line arrows in those figures indicate direction of movement of parts of the meter; the full line arrows movement of the liquid.

Fig. 4A shows diagrammatically the state of affairs depicted in Figs. 1 and 2. Liquid is supplied under pressure through the port 150 (Fig. 4A) into the bore 146 of the left hand piston. The bore 146 leads to the left hand end of the cylinder so that liquid will be delivered into the cylinder space 168 (Fig. 2) and the piston will be forced to the right (Fig. 4A) or upwards (Fig. 2). The liquid in the cylinder space 170 (Fig. 2) will, consequently be forced through the bore 148 and out of the port 152 into the delivery passage 124 and thence out of the meter. The axial movement of the piston causes the piston to rotate clockwise so that the ports 150 and 152 are gradually obturated by the lands 160 and 162 until the piston reaches the end of its stroke, when the ports are fully covered as shown in Fig. 4B.

In the meantime, the right hand piston (Fig. 4A) moves from the position shown in Fig. 4A to that shown in Fig. 4B. In Fig. 4A, the ports 150 and 152 of the right hand piston are shown completely covered by the lands 162 and 160. The clockwise rotation of the left hand piston results in similar rotation of the right hand piston so that the ports 150 and 152 of the right hand piston are gradually uncovered. Pressure is thus built up at the right hand end of the right hand piston so that said piston then moves to the left which is the direction of movement which corresponds to a clockwise movement of the piston with the pin 142 in the position shown in Fig. 2. The axial movement of the piston results in liquid being forced out of the cylinder through the bore 146 and the port 150 into the common delivery passage 124. The movement of the piston to the left continues beyond the position of Fig. 4B in which the ports 150 and 152 are just completely uncovered by the lands 162 and 160. The pinion 132 also continues to rotate and consequently causes the rotation of the piston to be reversed so that the ports are again gradually covered until they reach the fully covered position shown in Fig. 4C.

The pinion 132 associated with the left hand piston also continues to rotate after the position of Fig. 4B has been reached, with the consequence that the axial movement of the piston is reversed by its rotation clockwise continues thus bringing the ports 150 and 152 beyond the lands 160 and 162. The bore 148 is thus brought into communication with the supply passage 118 through the transfer passage 165 and the slot 156 as shown in Fig. 4C. The piston is thus driven to the left until its ports 150 and 152 are fully open, and liquid is discharged through the bore 148 and the port 152 into the common delivery passage 124. The piston is now again in its mid-stroke position. Its axial movement to the left continues but its connection to its pinion 132 causes its rotation to be reversed, that is to say to become counterclockwise. The ports 150 and 152 are thus gradually covered again by the lands 160 and 162 until the position of Fig. 4D is reached.

The right hand piston was left in the position of Fig. 4C, that is to say at the end of its stroke to the left and rotating counterclockwise. The counterclockwise rotation persists and, in consequence, the direction of axial movement is reversed and the ports 150 and 152 are carried beyond the lands 162 and 160. The bore 146 is thus brought into communication with the supply passage 118 through the transfer passage 165 and the slot 156 as shown in Fig. 4D. The piston is thus driven to the right until its ports are fully open, and liquid is discharged through the bore 148 and the port 152 into the common delivery passage 124. The piston is now again in its midstroke position. Its axial movement to the right continues but its connection to its pinion 132 causes its rotation to be reversed so that the position shown in Fig. 4A is re-established.

Meanwhile, the left hand piston which had reached the end of its forward stroke as shown in Fig. 4D continues its counterclockwise rotation but reverses its axial movement so that liquid is supplied through the port 150 and delivered through the port 152 until the position shown in Fig. 4A is re-established. That completes one cycle.

At all times during the cycle one or the other of the two pistons is being driven by the supply pressure; also, at all times liquid is being delivered by one piston or the other through the delivery passage; further, at all times, the pistons are radially balanced.

This balance is achieved by means of the transfer passage 165 and the passage 166 at right angles to it. As will be seen from Figs. 4A–4D, an area of the piston equal to that of the slot 116a is always subjected to the supply pressure. The slot 156 in the cylinder liner, however, is of the same size as and is directly opposite the slot 116a. Also, the transfer passage 165 is always in communication with both slots. Equal and opposite thrusts are thus always exerted on the piston.

Furthermore, the slot 122 leading to the discharge passage 124 has opposite it the equally large slot 154 and these two slots are always in communication with each other through the passage 166. Thus, the delivery pressure is exerted equally and oppositely on the two sides of the piston.

The supply pressure being greater than the delivery pressure, considerable benefit can be gained from the use of only the passage 165, the passage 166 being omitted.

The use of the passage 165 both as a balancing passage and as a transfer passage is a valuable feature leading, as it does, to a great simplification. If it is to serve as a transfer passage, the passage 165 must be at least as large as the bore which it supplies; otherwise, the requisite amount of liquid might not reach the cylinder. The single passage shown could, of course, be replaced by a number of passages, which could be over smaller diameter than the bore.

The passage 166 being only a balancing passage, its size is not critical. It should, of course, be large enough to ensure a free flow of liquid through it.

The reduction of the number of bores and ports to two is also of great importance. When the left hand piston passes through the position of Figs. 4B and 4D and the right hand piston passes through the position of Figs. 4A and 4C, the ports 150 and 152 must be fully covered; if they are not, leakage will occur and the metering accuracy will be affected. On the other hand, the period of total eclipse must be very small—theoretically, it must be infinitesimally small; otherwise, the supply pressure could not operate the meter unless, of course, there was enough clearance between the piston and the liner to allow leakage to take place. The ports and the lands must, therefore, be very accurately matched.

Thus, the reduction in the number of ports reduces both the manufacturing cost and the loss of metering accuracy due to leakage.

The construction and operation of a meter having pistons with three bores and ports is illustrated diagrammatically in Figs. 5A–5D. These figures show the left hand piston of a meter in positions corresponding to those of Figs. 4A–4D.

The piston has three bores X, Y, and Z, the bores X and Z proceeding from the right hand end of the piston and the bore Y from the left hand end.

In Fig. 5A, the bore X is idle; the bore Y is the supply bore and the bore Z the delivery bore.

In Fig. 5C, the bore X is the supply bore, the bore Y is the delivery bore and the bore Z is idle.

The relative axial and rotational movements of the piston are exactly the same as in Figs. 4A–4D.

Two balancing passages 165 and 166 are provided but neither acts as a transfer passage. It is the use of one of the balancing passages as a transfer passage which allows the number of bores to be reduced to two. Two is, of course, the irreducible minimum.

It will be appreciated that the bores need not necessarily be cylindrical as shown; nor need the ports be circular; nor need the balancing and transfer passages be cylindrical.

Although the meter described above has been designed particularly for the dispensing of lubricating oil to motorists, the features of the invention are applicable to meters of the kind in question designed for dealing with liquids of all kinds. The nature of the liquid will, in general, affect only the size of the meter and the working clearances of its parts. Meters incorporating the features of this invention have the advantage of being of light weight compared with other meters and, therefore, are particularly suitable for incorporation in portable delivery units such as that described in application Serial No. 101,738.

I claim:

1. A fluid meter comprising a pair of cylinders, a piston in each of said cylinders, a fluid inlet and a fluid outlet to each of said cylinders and means for rotating said pistons in said cylinders as a consequence of axial movement of said pistons under the influence of fluid entering said cylinders through said inlets, each of said pistons having bores extending from each of its ends towards the other end without reaching the latter and having ports in its cylindrical surface in communication with said bores, a recess substantially diametrically opposite the inlet associated with said cylinder and a passage in each piston extending transversely to the axis thereof and out of communication with said bores and which, in all positions of the piston, maintains communication between said inlet and said recess, said recess being so dimensioned relatively to the dimensions of said inlet that the area of the piston which is exposed to the fluid supply pressure through said inlet is the same as the area of the piston which is subjected to the fluid supply pressure transmitted to it through said passage and said recess.

2. A fluid meter as claimed in claim 1 in which each cylinder has a second recess in its wall substantially diametrically opposite the outlet associated with said cylinder and each piston has extending through it transversely to its axis and transversely to the said passage and out of communication with the latter and with said bores, a second passage which, in all positions of the piston, maintains communication between said outlet and said second recess, said second recess being so dimensioned relatively to the dimensions of said outlet that the area of the piston which is exposed to the fluid delivery pressure through said outlet is the same as the area of the piston which is subjected to the fluid delivery pressure transmitted to it through said second passage and said second recess.

3. A fluid meter comprising a pair of cylinders, a piston in each of said cylinders, a fluid inlet and a fluid outlet to each of said cylinders and means for rotating said pistons in said cylinders as a consequence of axial movement of said pistons under the influence of fluid entering said cylinders through said inlets, each of said pistons having bores extending from each of its ends towards the other end without reaching the latter and having ports in its cylindrical surface in communication with said bores, each cylinder being fitted with a liner, each of said liners having openings in it whereby to expose one pair of portions of the cylindrical surface of the piston situated substantially diametrically opposite each other and of substantially the same area and also a second pair of portions of said cylindrical surface of substantially the same area and situated in the intervals between said first mentioned pair and each piston having two passages extending transversely through it out of communication with each other and with said bores, said passages extending one between the two areas of said first mentioned pair and the other between the two areas of said second mentioned pair and one of said openings in said liner being in direct communication with said inlet and one of said openings being in communication with said outlet.

4. A fluid meter comprising a pair of cylinders, a piston in each of said cylinders, a fluid inlet and a fluid outlet to each of said cylinders and means for rotating said pistons in said cylinders as a consequence of axial movement of said pistons under the influence of fluid entering said cylinders through said inlets, each piston being provided with two ports in its cylindrical surface with two bores each connecting a different one of said ports to a different end of the piston and with a passage extending therethrough transversely to its axis out of communication with said bores, said ports serving alternately and oppositely for the supply and delivery of the liquid to and from said bores and one of said ports when acting as a supply port being in direct communication with the source of supply and the other when acting as a supply port being in indirect communication with the source of supply through said transverse passage.

5. A fluid meter as claimed in claim 4, in which each of said cylinders is formed with a recess whereby to expose an area of said pistons equal to that exposed to the supply pressure in the vicinity of said ports and in which said passage is positioned so as always to establish communication between the source of supply of liquid and said associated recess.

HARRY GODFREY SOAR.

REFERENCES CITED

The following references are of record in the file of this patent:

UNITED STATES PATENTS

| Number | Name | Date |
|---|---|---|
| 49,809 | Washburn | Sept. 5, 1865 |
| 315,516 | Lane | Apr. 14, 1885 |
| 378,847 | Nash | Feb. 28, 1888 |
| 441,947 | Eickershoff | Dec. 2, 1890 |
| 569,546 | Crandall | Oct. 13, 1896 |
| 688,378 | Anderson | Dec. 10, 1901 |
| 700,974 | Nielsen | May 27, 1902 |
| 2,015,267 | Granberg | Sept. 24, 1935 |
| 2,395,715 | Berck | Feb. 26, 1946 |
| 2,399,316 | Berck | Apr. 30, 1946 |
| 2,457,710 | Norbom | Dec. 28, 1948 |